United States Patent [19]

Mukaida

[11] Patent Number: 5,795,608

[45] Date of Patent: Aug. 18, 1998

[54] PROCESS FOR PREPARING COATING PARTICLES USED FOR A FRIED FOOD

[75] Inventor: Kouhachi Mukaida, Aomori-ken, Japan

[73] Assignee: Hachitei Corporation, Aomori-ken, Japan

[21] Appl. No.: 692,460

[22] Filed: Aug. 5, 1996

[51] Int. Cl.⁶ .................................................. A21D 10/00
[52] U.S. Cl. .......................... 426/439; 426/440; 426/560; 99/404; 99/405
[58] Field of Search ................................ 426/439, 560, 426/440; 99/404, 405

[56] References Cited

U.S. PATENT DOCUMENTS

| 3,486,904 | 12/1969 | Ziegler | 99/1 |
| 4,496,601 | 1/1985 | Rispoli et al. | 426/555 |
| 4,699,796 | 10/1987 | Belshaw et al. | 426/439 |
| 4,861,609 | 8/1989 | Willard et al. | 426/439 |
| 5,464,642 | 11/1995 | Villagran et al. | 426/439 |

FOREIGN PATENT DOCUMENTS 4-84864  3/1992  Japan.
2178637  2/1987  United Kingdom.

*Primary Examiner*—Lien Tran
*Attorney, Agent, or Firm*—Sughrue, Mion, Zinn, Macpeak & Seas, PLLC

[57] ABSTRACT

A process for preparing coating particles for a fried food, which has a good taste and soft texture, by mixing raw materials including one of flour, starch, cereal powder, and seasoning, together with water, thereby forming a mixture in a slurry form, and then frying the mixture with the use of an edible oil contained in a frying apparatus, in which the process includes: pouring the mixture through a feeder onto a surface of an edible oil which is retained in a pouring portion away from a flowing portion of the frying apparatus, so as to admit a deep penetration of the mixture into the edible oil, thereby forming a prefried coating; and, frying the prefried coating at a secondary stage by an application thereto of a movement with a simultaneous agitation on the surface of the edible oil of the frying apparatus, thereby forming prefried coating particles.

3 Claims, 2 Drawing Sheets

PROCESS FOR PREPARING COATING PARTICLES USED FOR A FRIED FOOD

BACKGROUND OF THE INVENTION

1. Field of the Invention

This invention is related to a process for preparing coating particles used for a fried food with a good taste and a soft texture, and without the retention of any remaining oil.

2. Description of the Related Art

Recently, a change in life style has promoted a development of various kinds of palatable fried foods with good taste, which may be prepared by a frying process using an edible oil, and also permissible for mass production using a frying apparatus.

Fried food is divided into two types, such as a fried food with a coating layer of bread crumbs and a fried food with a coating, layer of flour or the like, for example Japanese "Tempura". The conventional technique as to the coating layer of the fried food is as follows.

The food with the coating layer of bread crumbs is prepared by the steps of:

- coating the fish, meat or the like, with a batter mixture, which consists of flour, egg and water, which is prepared thin enough to drop from a spoon, thereby forming a batter mixture layer adhering to the surface of the fish, meat or the like,
- covering the fish, meat or the like with bread crumbs, using the batter mixture layer, and
- frying the fish, meat or the like with the layer of bread crumbs, by using edible oil, thereby preparing the fried food with the coating layer of the bread crumbs.

The bread crumbs are prepared by crumbling the baked bread into small crumbs and hence the coating layer of the bread crumbs generated by frying thereof has a good taste and good texture.

However, the coating layer of bread crumbs may exhibit a tendency to some problems due to the fact that it is porous. The defect is such that the edible oil penetrating into the coating layer of bread crumbs may remain between voids or pores thereof, and hence the remaining oil is not released from the coating layer, immediately after frying with the use of the edible oil. To encourage ejection of the remaining oil from the coating layer of bread crumbs, the coating layer of bread crumbs is left in a static state, for a long time interval. But, this long time interval causes a deep penetration of the remaining oil into the coating layer of bread crumbs, resulting in losing the taste and flavor contained therein.

Japanese patent disclosure No.56 (1981) - 29965 describes a process of making fried food with the coating layer of bread crumbs.

The process is conducted with the use of a combination of bread crumbs with small size thereof and a batter mixture with thin concentration thereof, and hence a coating layer of bread crumbs with a good taste and a good texture is produced.

However, the process utilizes bread crumbs for a preparation of the coating layer of bread crumbs, and hence has therein the defects described above.

A conventional technique as to a preparation of a coating layer of fried food, i.e. Tempura, is as follows:

The process according to a conventional technique is described in Japanese patent application No.49 (1974) - 117637.

The process implies that the raw materials consisting mainly of flour, egg and water are fried with the use of edible oil, thereby producing fried fragments, which may be utilized as the coating material for preparing the coating layer of the fried food, i.e., Tempura.

The fried fragments are prepared, by frying a batter mixture consisting mainly of flour and water, at a condition equal to the conventional condition required for frying Tempura, with the use of the edible oil.

Accordingly, the fried fragments have a greater size and palatable taste different from the fried food with the coating layer of bread crumbs.

In general, fried fragments are called "Agedama" in Japanese speech, and also are effectively one portion cut off from the coating layer of "Tempura".

Each of the fried fragments have therein voids or pours, of which size and shape are different from each other, and also some hard solid portions. The hard solid portion lowers the palatable taste of the coating layer of the fried fragments.

Furthermore, the hard solid oil portion interferes with the emission of the remaining oil disposed in the voids or pores of the coating layer of the fried fragments. Consequently, the fried food with the coating layer of fried fragments is impregnated with a great amount of the remaining oil, and hence has an oily taste.

Additionally, the oily fried food is brought down in quality, due to the lapse in time interval for storage. Namely, the fried food has an edible time interval, between which the fried food can be eaten with a good taste. The oily fried food which contains a large amount of oil has an edible time interval which is shorter than the edible time interval of the fried food such as frozen "Tempura". The frozen Tempura is prepared by steps subjected in sequence to a frying step with the use of the edible oil, and consequently to a freezing step. The frozen "Tempura" is heated by using an electric oven, immediately before being eaten.

The frozen "Tempura" has thereon a coating layer with one portion, which forms hard solid portions. The coating layer has voids or pores which are not distributed uniformly in shape and size. Therefore, in the coating layer, there are some remnants of the oil which penetrated during frying and ice particles are produced at a limited position on the coating layer during freezing and storage.

In this way by cooking the frozen fried food so as to heat it in an edible state by using an electric oven, the ice particles disposed in the coating layer are defrosted into water, and then the water evaporates into vapor in large volumes. The vapor wets the coating layer, and reduces in a certain degree the palatability thereof. For this reason, it is generally thought that Tempura should be eaten fresh.

To meet the requirements of the consumers, according to Japanese patent publication No.63 (1988)-64183, there is presented a process of making coating particles used for preparing the coating layer of fried food.

The fried food prepared with the use of the coating particles is with a soft texture different from that of conventional fried food.

Namely, the process for making the coating particles is subjected to the steps of mixing a raw material consisting mainly of flour or the like together with water, to such an extent that no problems as described previously occur during frying with the use of edible oil, and frying the raw material using a large amount of water at a temperature ranging between 150° C. and 180° C., with the is use of edible oil, to thereby continuously produce the coating particles.

The process enables the production of coating particles in a 3 mm. approx. size. The water content of the raw materials to be fried is at least one and a half times as much as the flour used.

In this way, when the raw material containing a large amount of water is fried by preparing the coating particles with the use of the edible oil, the water of the raw material evaporates and also flows out from the raw coating material. Such water evaporation and ejection admits of a formation of pores or voids in the coating layer, and hence the pore formation encourages in a considerable degree a porosity of the coating particles.

At the time of frying, heating of the raw material and simultaneous evaporation of the water contained therein, admits of a formation of the coating particles with various sizes and shapes different from each other. Therefore, the coating particles with a size of approx. 3 mm, cannot be picked up at a high rate.

The coating particle is porous to a degree. The coating particles are provided in an inner portion thereof with pores or voids, which are not easily removed, and which have therein the remaining oil. With the heating of the coating layer at the time of frying with the use of edible oil, the remaining oil penetrates deeply into the pores or voids formed between the coating particles of the coating layer.

Furthermore, the fried food with the coating layer is frozen for storage thereof and the resulting frozen fried food is heated by an electric oven. At this time, the remaining oil in the pores of the coating particles of the coating layer reduces the good taste of the coating layer.

SUMMARY OF THE INVENTION

The present invention has the object of overcoming the problems described above, and is related to a process for continuously preparing coating particles with sizes and shapes which are not different from each other, the coating particles enabling the easy ejection of the remaining oil therein, and providing means to carry out the object of the invention.

The present invention concerns a process of making coating particles steps comprising the steps of mixing raw materials with an amount of one or more items selected from flour, starch, cereal powder or the like, and seasoning, as desired, together with a large amount of water, thereby forming a mixture in a slurry form, and to frying said mixture with the use of an edible oil contained in a frying apparatus, in which said process comprises:

prefrying at the primary stage said mixture by steps of pouring and penetrating deeply said mixture into said edible oil disposed in one portion of said frying apparatus and incrementally elevating upwardly said mixture onto the surface of said edible oil disposed in the other portion away from said one portion of said frying apparatus, thereby forming pre-fried coating particles, and, frying at the secondary stage said pre-fried coating particles by applying to pre-fried coating particles a movement with a simultaneous agitation on the surface of said edible oil resting in said other portion of said frying apparatus.

DESCRIPTION OF THE PREFERRED EMBODIMENT

Figure 1:
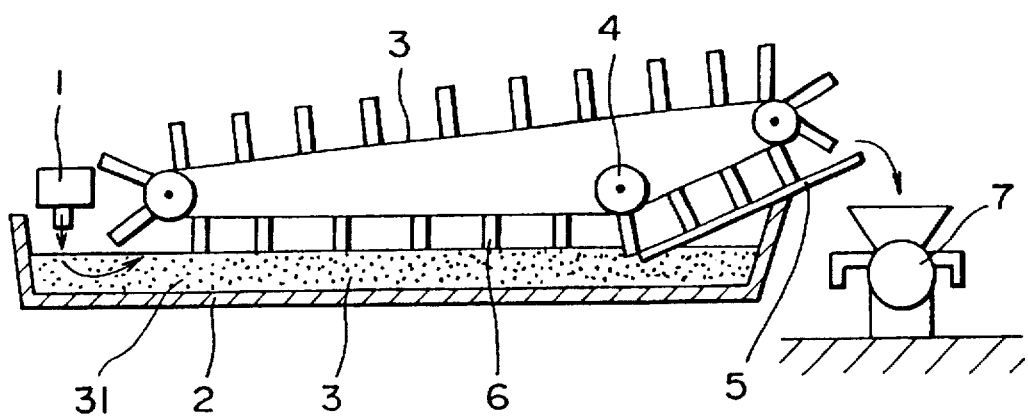
FIG. 1 is a side view of the inventive apparatus for making the coating particles.

In FIG. 1, reference numeral 1 shows a feeder serving to feed and pour the raw materials in a slurry form onto an edible oil 31, which is placed in a frying apparatus 2. The raw materials with a slurry form are prepared, by mixing flour or the like, with a large amount of water.

The frying apparatus 2 is provided with an inlet and an outlet, between which an endless conveyor 3 is provided which dips into the edible oil 31 in the frying apparatus 2.

The conveyor 3 comprises a pair of chains situated parallel to each other. Each chain is driven and runs continuously, by means of a sprocket or the like.

At the portion adjoining the outlet of the frying apparatus 2, the conveyor 3 has an end portion disposed in an oblique manner and upwardly from the surface of the edible oil 31. An oblique plate 5 is placed parallel to the end portion of the conveyor 3. The oblique plate 5 has therein pores, which permit separation and rejection of the remaining oil from the coating particles, immediately after frying with the use of the edible oil 31.

Specifically, the raw material pouring from the feeder 1 flows onto the surface of the edible oil 31 in the frying apparatus 2, by utilizing the conveyor 3, and is fried in the meantime with the use of the edible oil 31.

The frying with the use of the edible oil 31 finishes at the time when the raw material reaches the oblique plate 5, thereby forming the coating particles.

The coating particles move upwardly along the oblique plate 5, and the pores of the coating particles serve to cause an ejection of the oil adhering to the surface of the coating particles.

Furthermore, as an alternative to the oblique plate 5 with pores, any device which allows oil ejection, i.e., a screen plate can be used.

The conveyor 3 is provided at a direction perpendicular thereto with means for making the coating particles move along the oblique plate 5.

Such means have preferable examples, such as a gathering plate 6.

The gathering plate 6 serves to gather and convey the coating particles flowing on the edible oil 31 and to move the coating particles along the oblique plate 5.

Thus, the constructed apparatus serves to pour the raw material in a slurry form onto the pouring portion of the edible oil surface, by the feeder 1. The poured raw material penetrates downwardly into the edible oil 31 for a while, for example 2 to 3 sec., and then turns around upwardly and is raised onto the flowing portion of the edible oil surface, the flowing portion being spaced from the pouring portion, thereby prefrying the raw materials. The pre-fried raw material is conveyed along the edible oil surface by the gathering plate 6 secured to the conveyer 3 and also, an agitation of the pre-fried raw material takes place, resulting in the secondary frying of the prefried raw material and production of the fried coating particle.

The traveling time interval till the pre-fried raw material reaches the oblique plate 5 is from 15 sec. to 60 sec., preferably from 20 sec. to 40 sec., especially preferably from 25 sec. to 35 sec.

As described above, the inventive process comprises two steps, such as a prefrying step at the primary stage, and a secondary frying step at the secondary stage. The prefrying step is carried out on the pouring portion of the edible oil surface, and the secondary step is carried out on the flowing portion of the edible oil portion, which is spaced from the pouring portion. Furthermore, the secondary frying step fries the pre-fried raw material conveyed and moved by the gathering plate 6 and then enables the production of the coating particles with pores uniformly distributed.

Namely, the frying step at the secondary stage of the inventive process admits of a gradual evaporation of the water contained in the large quantity of raw material in slurry form, and the gradual evaporation proceeds always at a certain rate.

Therefore, the frying step at the secondary stage enables a good growth of pores with uniform shapes of the coating particles and properly forms the pores throughout the surface and the inner portion of each coating particle.

In FIG. 1, reference numeral 4 shows pulleys, through which the conveyor 3 with the gathering plates 4 is driven.

Figure 2:
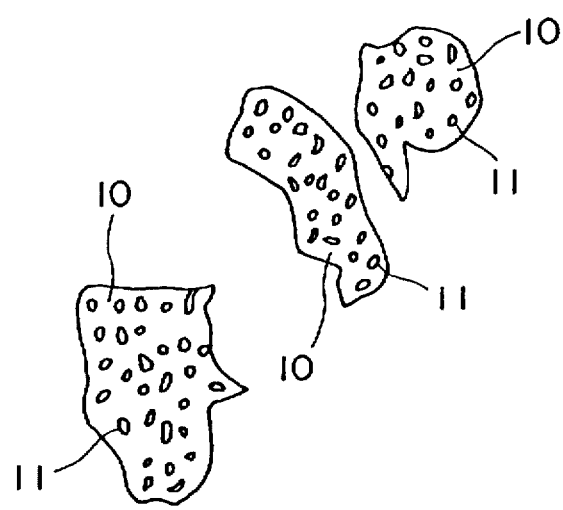
FIG. 2 is a top view of the coating particles prepared by the inventive process.

In detail, FIG. 2 shows the coating particle 10.

The coating particle 10 has therein pores 11.

The pores 11 are of a uniform shape, respectively and formed so as to be properly apportioned throughout and all over the coating particle 10.

The water containment of the raw material is 3 to 15 times as much as the conventional water contain meet, by weight.

When the pre-fried coating particles subjected to the prefrying step at the primary stage is fried with the use of the oil, without conveying and simultaneous agitating the particles on the edible oil surface, the water containment of the pre-fried coating particle evaporates instantaneously and hence causes a dangerous accident. This is because the evaporation of the water contained in the raw material causes a generation of water vapor, and hence the resultant water vapor flows out in a large quantity instantaneously from the pre-fried coating particles. In addition, the pores are formed so as to be concentrated on a local area of the coating particle, and some hard portions are formed in the coating particle.

On the contrary, the inventive process enables movement along the edible oil surface of the pre-fried raw materials by rolling caused by oil agitation using the plate 6.

According to the step at the secondary stage of the inventive process, the pre-fried raw materials are fried so as to dash the oil spray onto the surface of the pre-fried raw materials.

Thus frying at the secondary stage carries out a gradual evaporation at a fixed rate of the water in a large quantity. The resulting gradual evaporation causes a gradual generation of water vapor, and leads to a formation of pores, which are dispersed uniformly, so as to dispose the pores throughout the surface and the inner portion of the coating particle.

From the above, as shown in FIG. 2, the coating particle 10 has therein pores 11, which are of a uniform shape and uniformly dispersed all over the coating particle, and it moves upwardly along the oblique plate 5.

The upward movement along the oblique plate 5 of the coating particle permits the remaining oil to flow out with ease from the pores of the coating particle 10.

In addition to this, at a position adjoining the outlet of the oblique plate 5, there is provided a centrifugal separator 7, which serves to enable ejection of the edible oil, as shown in FIG. 1.

The centrifugal separator 7 carries an arrangement of the coating particle 10, so that the coating particle 10 is uniform in the shape and size thereof.

Namely, the centrifugal force applied to the coating particle 10 depends upon the shape and size thereof.

Accordingly, the coating particle 10, which includes one portion with small specific gravity, is, subjected to centrifugal force separation, and in such a condition, the centrifugal force applied to the large specific gravity portion is different from that applied to the small specific gravity portion. The difference in centrifugal force causes a breakage of the coating particles, and the breakage causes a uniformity in size and shape of the coating particle. The use of the centrifugal separator 7 allows a preparation of the coating particle with the size of 2 to 5 mm. or the specific gravity of 0.2 to 0.4 g/cm$^3$.

In addition, the type of centrifugal separator 7 is preferably such that the continuous ejection and separation of the remaining oil from the coating particle is carried out. The reason is that the viscosity of the oil falls with the lapse of time, and the fall of the oil viscosity leads to the fall of efficiency of the separation of the oil from the coating particles.

Furthermore, the raw material in slurry form consists mainly of flour, in general, and of a mixture of flour and starch, especially. In addition, in the raw material, egg, salt, pepper or the like, can be added.

As to the addition of water, 150 to 300 parts by weight of water is preferably added to 100 parts by weight of water.

The increase in the addition of the water causes a phenomenon, such that the coating particles are formed.

However, the addition of excess water causes the ejection of the water contained in the raw material in slurry form to take a long time and to lead to a deep penetration of the material in slurry form into the edible oil 31 occupied in the flying apparatus 2, at the time of pouring the raw material in slurry form onto the surface of the edible oil 31 placed in the frying apparatus 2.

As a result, the size and shape of the coating particles are not homogeneous, respectively.

On the contrary, added water in too small a quantity causes an increase in the viscosity of the raw material in slurry form and in consequence, the size of pores of the coating particles are apt to be too big.

The edible oil may employ either a liquid oil and a solid oil, which admits of a solidification at room temperature and melting upon heating.

The fall of the edible oil temperature to 150° C. or lower causes the remaining oil staying in the coating particle to be not easily rejected.

The preferable range of the edible oil temperature is 170° C. or more.

One example of the invention is as follows:

The inventive process has an example, which is as follows:

3.0 kg of flour is added, something like 7.0 kg of water and some seasoning.

The flour, water and seasoning are mixed and agitated, thereby forming a raw material in a slurry form.

The raw material in slurry form is poured on the surface of the palm oil 31 heated at a temperature of 180° C. by using the feeder 1 of the frying apparatus 2, which is shown in FIG. 1.

The raw material in slurry form penetrates into the palm oil 31 for a while. Thereafter, when 3 to 4 sec. lapses, pre-fried coating particles fried at the primary stage float up to the position of the palm oil surface adjoining the inlet of the conveyor 3.

At the primary stage, the penetration and floating caused a conversion of the slurry form into a particle form of the raw material and also prefrying of the raw material in particle form.

Thereafter, the gathering plate 6 of the conveyer 3 moves the pre-fried coating particles in a direction shown by the arrow of FIG. 1.

It takes about 30 sec. so that the pre-fried particles reach the oblique plate 5, and are simultaneously fried at the secondary stage with oil agitation, thereby forming the fried coating particles.

The resultant coating particles comprise 20% approx. by weight of particles in size of 0.5 to 3 mm., 45% approx. by weight of particles in size of 3 to 5 mm., and 35% approx. by weight of particles in size of 5 mm. or over.

Each of the coating particles has commonly a sectional view, in which pores are uniformly dispersed as shown in FIG. 2, and has a specific gravity by volume in the average of 0.6 g/cm.

Thereafter, the coating particles are subjected to the oil ejection and separation process employing the centrifugal separator 7, and then cause an arrangement in which the size of 3 to 5 mm. and the specific gravity of 0.3 g/cm$^2$, or lower, are achieved. In addition, the resulting coating particles lack the majority of the remaining oil.

Next, the resulting coating particles, are used to cover the fish or meat, thereby forming the coating layer of the coating particles on the surface of the fish or meat, which was subject to a frying process using the palm oil under ordinary conditions. As a result, the fish or meat fried with the coating particles was prepared.

In experimental results, the fish was eaten by 50 persons, among which 45 persons reported that the fried fish had a good taste and good texture.

The fried fish was subjected to a freezing process for storage thereof for 30 days. Thereafter, the frozen fried fish was defrosted by a conventional electric oven. The defrosted fried fish had a good taste and a good texture that compared well to that shown before the freezing process.

I claim:

1. A process of making coating particles by mixing raw materials comprising one of flour, starch, cereal powder, and seasoning, together with water to form a slurry, and then frying said slurry with the use of an edible oil contained in a frying apparatus, in which said process comprises the steps of:

prefrying said slurry at a primary stage, by pouring said mixture on a surface of said edible oil which is retained in a pouring portion away from a flowing portion of said frying apparatus, such that said slurry penetrates into said edible oil and elevating upwardly said slurry onto the surface of said edible oil, thereby forming prefried coating particles; and frying said prefried coating particles at a secondary stage in said flowing portion of said frying apparatus by an application thereto of a movement with a simultaneous agitation on said surface of said edible oil of said frying apparatus, thereby forming fried coating particles.

2. The process of making coating particles, according to claim 1, in which said prefrying of said slurry at said primary stage takes 2 to 5 seconds and said frying of said prefried coating particles at said secondary stage takes 15 to 60 seconds.

3. A process of making coating particles by mixing raw materials comprising one of flour, starch, cereal powder, and seasoning, together with water to form a slurry, and then frying said slurry with the use of an edible oil contained in a frying apparatus, in which said process comprises the steps of:

prefrying said slurry at a primary stage, by pouring and penetrating said slurry into said edible oil retained in a pouring portion of said frying apparatus and elevating upwardly said slurry onto a surface of said edible oil in a flowing portion away from said pouring portion of said frying apparatus, thereby forming prefried coating particles;

frying said prefried coating particles at a secondary stage in said flowing portion of said frying apparatus by an application thereto of a movement with a simultaneous agitation on said surface of said edible oil in said flowing portion of said frying apparatus, thereby forming fried coating particles;

removing a portion of said edible oil retained in said fried coating particles; and separating and removing a remainder of said edible oil retained in said fried coating particles, by utilizing a centrifugal force, so as to make said fried coating particles to have a uniform size.

* * * * *